INVENTORS
JOHN D. GOODELL
BARBARA IVINS
JOHN C. WISTRAND
VASIL TASI
BY
Brumbaugh, Free, Graves & Donohue
THEIR ATTORNEYS Aug. 6, 1963 J. D. GOODELL ET AL 3,100,090

MAGNETIC TAPE MAGAZINE CHANGER MECHANISM

Filed Sept. 2, 1959

7 Sheets-Sheet 2

INVENTORS
JOHN GOODELL
BARBARA IVINS
JOHN C. WISTRAND
VASIL TASI

BY

Brumbaugh, Free, Graves & Donohue

THEIR ATTORNEYS

INVENTORS
JOHN D. GOODELL
BARBARA IVINS
JOHN C. WISTRAND
VASIL TASI
BY Brumbaugh, Free, Graves & Donohue
THEIR ATTORNEYS INVENTORS
JOHN D. GOODELL
BARBARA IVINS
JOHN C. WISTRAND
VASIL TASI
BY
Brumbaugh, Free, Graves & Donohue
THEIR ATTORNEYS Aug. 6, 1963 J. D. GOODELL ET AL 3,100,090

MAGNETIC TAPE MAGAZINE CHANGER MECHANISM

Filed Sept. 2, 1959 7 Sheets-Sheet 5

INVENTORS
JOHN D. GOODELL
BARBARA IVINS
JOHN C. WISTRAND
VASIL TASI
BY
Brumbaugh, Free, Graves & Donohue
THEIR ATTORNEYS

MAGNETIC TAPE MAGAZINE CHANGER MECHANISM

Filed Sept. 2, 1959 7 Sheets-Sheet 6

INVENTORS
JOHN D. GOODELL
BARBARA IVINS
JOHN C. WISTRAND
VASIL TASI
BY Brumbaugh, Free, Graves & Donohue
THEIR ATTORNEYS

MAGNETIC TAPE MAGAZINE CHANGER MECHANISM

Filed Sept. 2, 1959 7 Sheets-Sheet 7

INVENTORS
JOHN D. GOODELL
BARBARA IVINS
JOHN C. WISTRAND
VASIL TASI
BY Brumbaugh, Free, Graves & Donohue
THEIR ATTORNEYS 3,100,090
MAGNETIC TAPE MAGAZINE CHANGER MECHANISM John D. Goodell, Greenwich, Barbara Ivins, Milford, John C. Wistrand, Stamford, and Vasil Tasi, Bridgeport, Conn., assignors to Minnesota Mining & Manufacturing Company, St. Paul, Minn., a corporation of Delaware Filed Sept. 2, 1959, Ser. No. 837,716
13 Claims. (Cl. 242—55.13)

The present invention relates to recording-reproducing apparatus utilizing magnetic tape and more specifically to new and improved apparatus of this character that is automatic in operation.

Much of the currently available tape recording-reproducing apparatus is designed for operation with tape about one-quarter inch wide transported usually at seven and one-half inches per second. For a playing time of about thirty minutes at this speed, a spool of tape approximately seven inches in diameter is required. The tape must be threaded through the tape transport path onto a takeup spool by hand and cycles through the usual stages, viz., play, stop, and rewind, manually. Moreover, it has not been possible to play automatically, in succession, a plurality of rolls of magnetic tape in the manner that disc records can be played automatically by conventional record changer mechanism. As a result, magnetic tape and recording-reproducing apparatus therefor have not achieved the popularity of disc records and record players.

It is an object of the invention, accordingly, to provide new and improved magnetic tape recording-reproducing apparatus that embodies all of the advantages of disc recordings and recording-reproducing apparatus for use therewith.

A further object of the invention is to provide new and improved magnetic tape recording-reproducing apparatus of the above character which is capable of performing a desired sequence of operations automatically.

Another object of the invention is to provide new and improved magnetic tape recording apparatus having means enabling a desired sequence of operations to be performed automatically with a plurality of rolls of tape in succession.

Still another object of the invention is to provide new and improved magnetic tape recording-reproducing apparatus in which means is provided for temporarily suspending a desired sequence of operations being performed automatically to allow a desired manually controlled operation to be effected.

A still further object of the invention is to provide a novel cartridge for storing magnetic tape and the like.

In its broader aspects, magnetic tape changer apparatus according to the invention comprises a movable platform which is adapted to receive a stack of cartridges containing magnetic tapes to be played. The platform is normally urged upwardly by spring means but is adapted to be pushed downwardly when magnetic tape cartridges are placed thereon and retained releasably in the downward position by escapement means cooperating with one of the cartridges. The free end of the tape in each cartridge terminates in a coupling element which is nested in a recess formed in the cartridge. In operation, the escapement is operated successively to move each of the cartridges into a playing position, at which time the coupling element on the cartridge is automatically coupled to a coupling member on a tape leader connected to a takeup spool.

The platform is movably mounted on a spindle which is provided with means to drive the hub of the cartridge when in the playing position to transport the tape at high speed, either in search or rewind operations, for example. Transport of the tape at normal speed as in recording or reproducing is effected by a driven capstan engaged by a pressure roller.

Automatic operation is effected by a control system which is adapted to establish sequentially cartridge indexing, play, and rewind cycles, in that order, the rewind cycle being effected at high speed and the tape being brought to rest gently at a predetermined end location at the end of this cycle. The system comprises a program stepping switch and complex cam means coupled to suitable clutch means, speed change means and other mechanical linkages, the stepping switch and cam means being actuated simultaneously to establish the successive operating cycles.

The invention also contemplates the provision of means enabling one or more of the operating cycles to be temporarily interrupted to permit the system to operate in a modified manner. For example, it may be desirable during a play cycle to cause the tape to be transported briefly at higher than normal speed in order to by-pass part of the program recorded on the tape.

For a better understanding of the invention, reference is made to the following detailed description of a typical embodiment taken in conjunction with the accompanying drawings in which.

Figures 1, 1F:
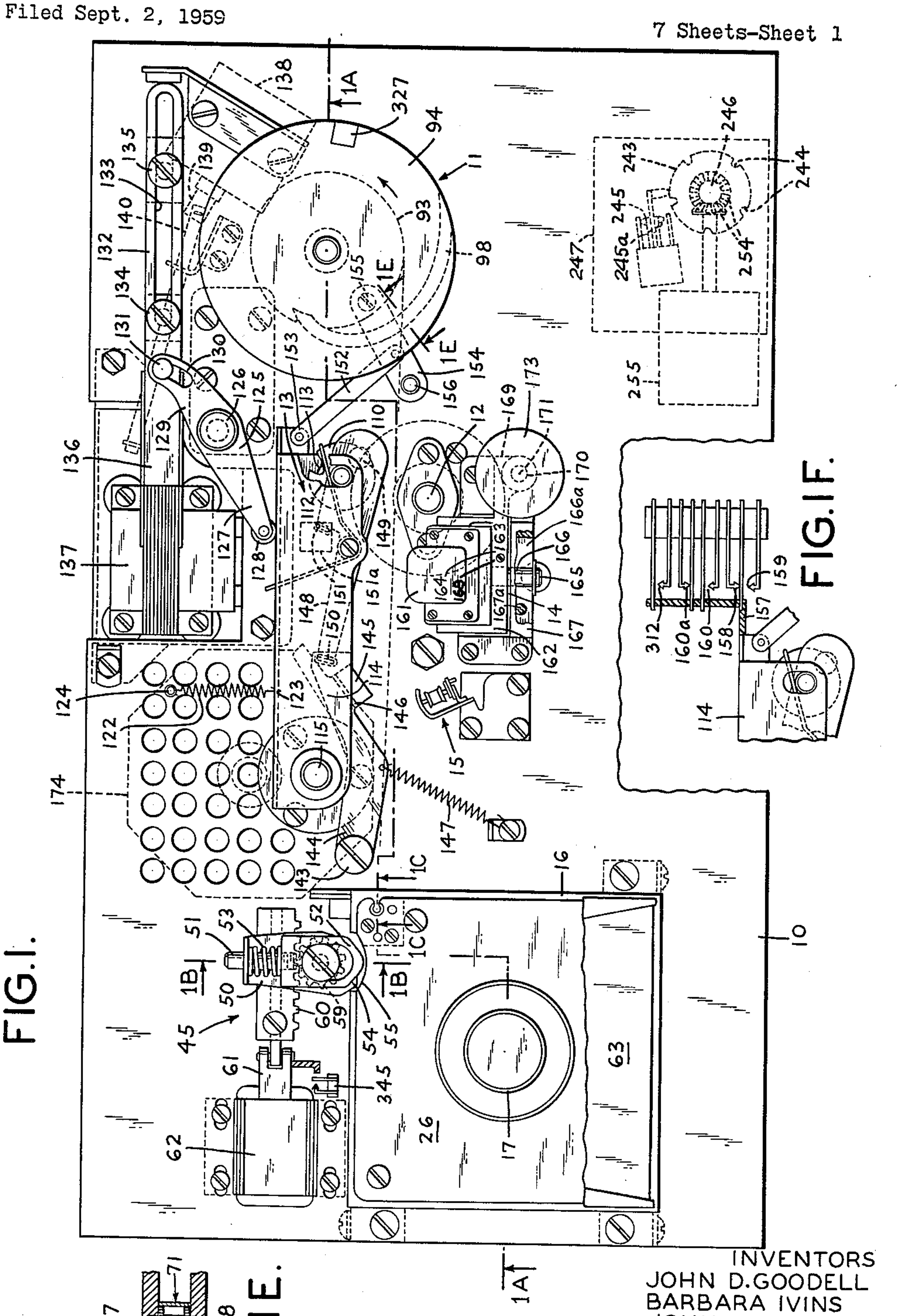
FIG. 1 is a plan view of tape recording-reproducing apparatus constructed according to the invention.
FIG. 1F is a partial plan view showing switch mechanism adapted to be actuated by the pressure roller support arm in the apparatus of FIG. 1.
Figure 1E:
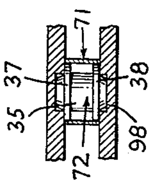
FIG. 1E is a view in vertical section taken along the line 1E—1E of FIG. 1.
Figure 1A:
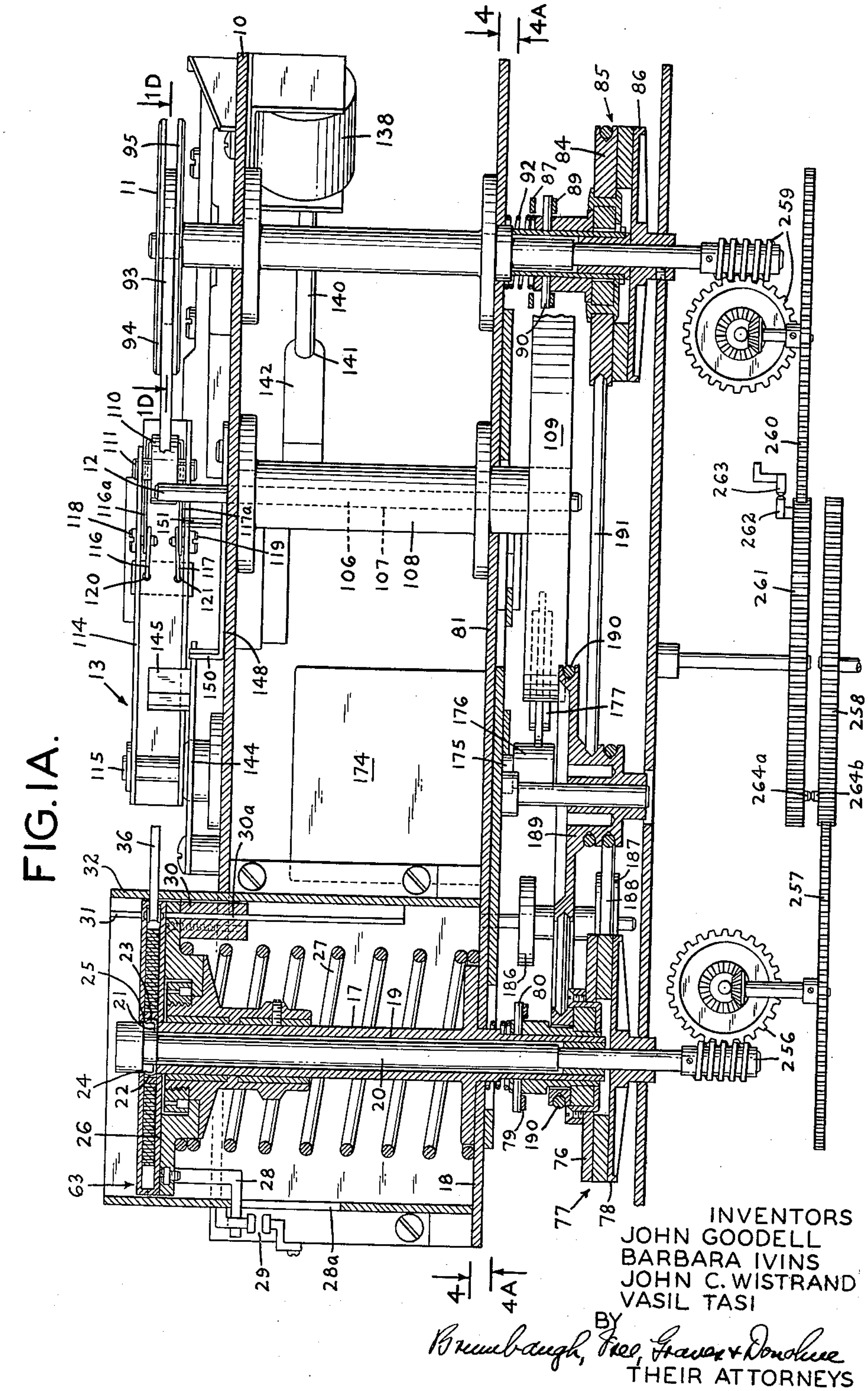
FIG. 1A is a view in vertical section taken along the line 1A—1A of FIG. 1, and looking in the direction of the arrows.

Referring to FIGS. 1 and 1A, magnetic tape cartridge changer mechanism according to the invention comprises a substantially rectangular cabinet having a top deck 10 on which are mounted a takeup spool 11, a capstan 12 and a cooperating pressure roller assembly 13, a magnetic recording-reproducing head assembly 14 and an erase head assembly 15. At one end of the cabinet is disposed a tape cartridge loading well 16 of substantially rectangular cross-section having an upwardly extending central cartridge loading post 17 secured to the bottom wall 18 thereof (FIG. 1A).

The loading post 17 has a central bore 19 through which extends a shaft 20 at the upper end of which is secured a plate 21 carrying laterally spaced apart upwardly extending spring detents 22 and 23. The detents 22 and 23 are adapted to project through opposed slots 24 and 25, respectively, formed at the upper end of the loading post 17 and they are preferably designed to facilitate the loading of cartridges on the loading post 17 while providing positive coupling between the shaft 20 and the hub of the cartridge located in the playing position as will be described in greater detail hereinafter.

Slidably mounted on the loading post 17 is a substantially rectangular cartridge platform 26 which is normally urged upwardly by a compression spring 27. The platform 26 carries an arm 28 which extends through a vertical slot 28*a* in the side wall of the loading well 16 and serves as a stop limiting upward movement of the platform 26 under the influence of the spring 27. At the uppermost position of the platform 26, the arm 28 acts to open a switch 29 which is closed whenever the platform is depressed. Secured adjacent one corner of the platform 26 is a downwardly depending guard member 30 (FIG. 1A) which is suitably bored at 30*a* so as to slide easily on a cartridge threading post 31 in the cartridge loading well 16 and secured to the side wall 32 thereof.

The cartridge threading post 31 (FIG. 1C) comprises two similar coaxial portions 33 and 34 separated by a gap in which a pull member 35 on the end of a tape leader 36 secured to the takeup reel 11 is adapted to be received. The adjacent edges 33*a* and 34*a* of the threading post portions 33 and 34 are suitably shaped to provide an opening of sufficient size to permit the pull member 35 to be moved to a position coaxial with the post 31, as shown. Also, the adjacent opposite edges 37*a* and 38*a* of the threading post portions 33 and 34 cooperate with shoulders 37 and 38 formed on the pull member 35 to serve as a stop for the latter.

The pull member 35 is adapted to be releasably retained in coaxial relation with respect to the threading post portions 33 and 34 by suitable means such as a latch 41. The latch 41 is biased by a spring 42 secured to the frame at 43 and is adapted to pivot about a post 44 also secured to the frame. Associated with the latch 41 for actuation thereby is a switch 44*a* which is normally closed when the pull member 35 is in its initial position between the loading post portions 33 and 34 and is adapted to be opened when the pull member is withdrawn from its initial position as the tape leader 36 is wound upon the takeup spool 11.

Cartridges in a stack on the platform 26 are adapted to be indexed successively to a playing position at the level of the tape leader 36 by suitable indexing mechanism 45 (FIGS. 1 and 1B) which is located at the rear of the cartridge loading well 16. The indexing mechanism 45 comprises a post 47 having a central bore 48 through which extends a shaft 49. At its upper end, the shaft 49 carries a plate 50 which is retained in place by a nut 50*a*. Slidably mounted on the nut 50*a* is a detent

52 having a guide pin 51 secured at the rear thereof. The guide pin 51 extends through a bore 51*a* formed in an upwardly extending rear portion 50*b* of the plate 50 and a spring 53 normally urges the detent 52 forwardly.

The forward end of the detent 52 is suitably shaped so that the cartridges can move freely past it when they travel in the downward direction but engage it firmly when they are pushed upwardly by the spring 27 under the platform 26. The plate 50 is also provided with a detenting portion 54 (FIG. 1) approximately 30° away from the detent 52 which cooperates with a cartridge in the stack to prevent the platform 26 from rising to its initial position when the cartridge then in the playing position is released by the detent 52. The loading platform 26 is cut away at 55, as shown, to clear the detents 52 and 54.

A spring 56 on the bottom of the shaft 49 serve to load the shaft 49 lightly in the downward direction when no cartridges are on the platform 26. When a stack of cartridges is retained in position on the platform 26, the spring 27 urges them upwardly and lifts the detent 52 upwardly against the spring 56. In this position, an actuator arm 57 on the shaft 49 closes a normally open switch 58, signalling the fact that a cartridge is in the tape transport position.

The shaft 49 carries a gear 59 engaging a rack 60 connected to the plunger 61 (FIG. 1) of a solenoid 62. When the solenoid 62 is energized, the plunger 61 is drawn into it and rotates the shaft 49 as required to index the topmost cartridge on the platform 26 to the playing position at level of the pull member 36, as will be described in greater detail later.

Typical magnetic tape cartridges suitable for use in the reproducing apparatus of FIG. 1 are disclosed in the copending application Serial No. 834,812, filed August 19, 1959, by John D. Goodell, Barbara Ivins and John Wistrand, for "Magnetic Tape Magazine," and it will not be necessary to describe them in detail herein. Suffice it to say that the cartridge 63 comprises (FIGS. 3 and 3A) a shallow rectangular container of substantially the same size as the loading platform 26 in which is mounted a rotatable hub member 64 on which is wound a spool of magnetic tape 65.

The tape 65 is reeled over a flanged floating guide member 66 that is positioned by a portion of the tape reeled on the hub member 64 and is slidable without rotation in slots 66 and 67 formed in the opposite walls 68 and 69 of the cartridge. The floating guide member 66 is adapted to be positioned by the main reel of tape 65 and it serves to guide tape on or off the main reel without introducing discontinuities in the side surface of the reeled tape.

The free end of the spool of tape 65 passes from the guide member 66 over a fixed guide 70 and terminates in a latching member 71 which is adapted to be snugly received within a recess 72 of similar shape formed adjacent one corner of the cartridge 63 in a position in substantial registry with the threading post 31 in the magazine loading well 16 (FIG. 1).

Figure 3B:
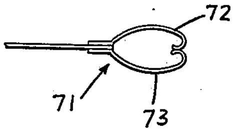
FIG. 3B is a view in plan of a coupling member on the end of the tape in the cartridge.

As best shown in FIG. 3B, the latching member 71 may comprise a pair of substantially parallel spring fingers 72 and 73 of a size to grasp snugly the pull member 35 (FIG. 1C) on the end of the leader 36 attached to the takeup reel 12.

The cartridges 63 are designed to lock together when stacked and to this end they are provided with "nesting" patterns in their adjacent surfaces.

The hub 64 of the cartridge 63 is provided with one or more grooves 74 around its inner periphery which are adapted to be engaged by the detents 23 and 24 at the upper end of the loading post 17 (FIG. 1A). Also, a suitable brake (not shown) should be provided for the hub 64 to prevent spillage and fouling of the tape. The brake may be of the type disclosed in the copending application Serial No. 841,808, filed September 23, 1959, by Benjamin B. Bauer, for "Tape Magazine," for example.

The cartridge 63 also has an arcuate recess 75 formed in an upper edge near the bore 72 which is adapted to accommodate the detent 52 on the escapement mechanism 45 to retain the cartridge releasably in the loading well 16 (FIG. 1).

The cartridge hub drive shaft 20 is required to be driven during the rewind cycle. To this end, it is connected to the driven element 76 (FIG. 1A) of a conventional clutch mechanism 77 having a driving element 78 which is normally maintained in engagement with the element 76 by a spring biased fork member 79 (FIG. 4C). The fork member 79 is pivotally mounted at 80 on the underside of a middle deck 81 (FIG. 4) and it carries a button 82 which is adapted to be actuated to disengage the clutch at the proper times during the operating cycle by means of a plurality of buttons 241 and 242 carried by a flat plate 83, as described in greater detail hereinafter.

Figure 4:
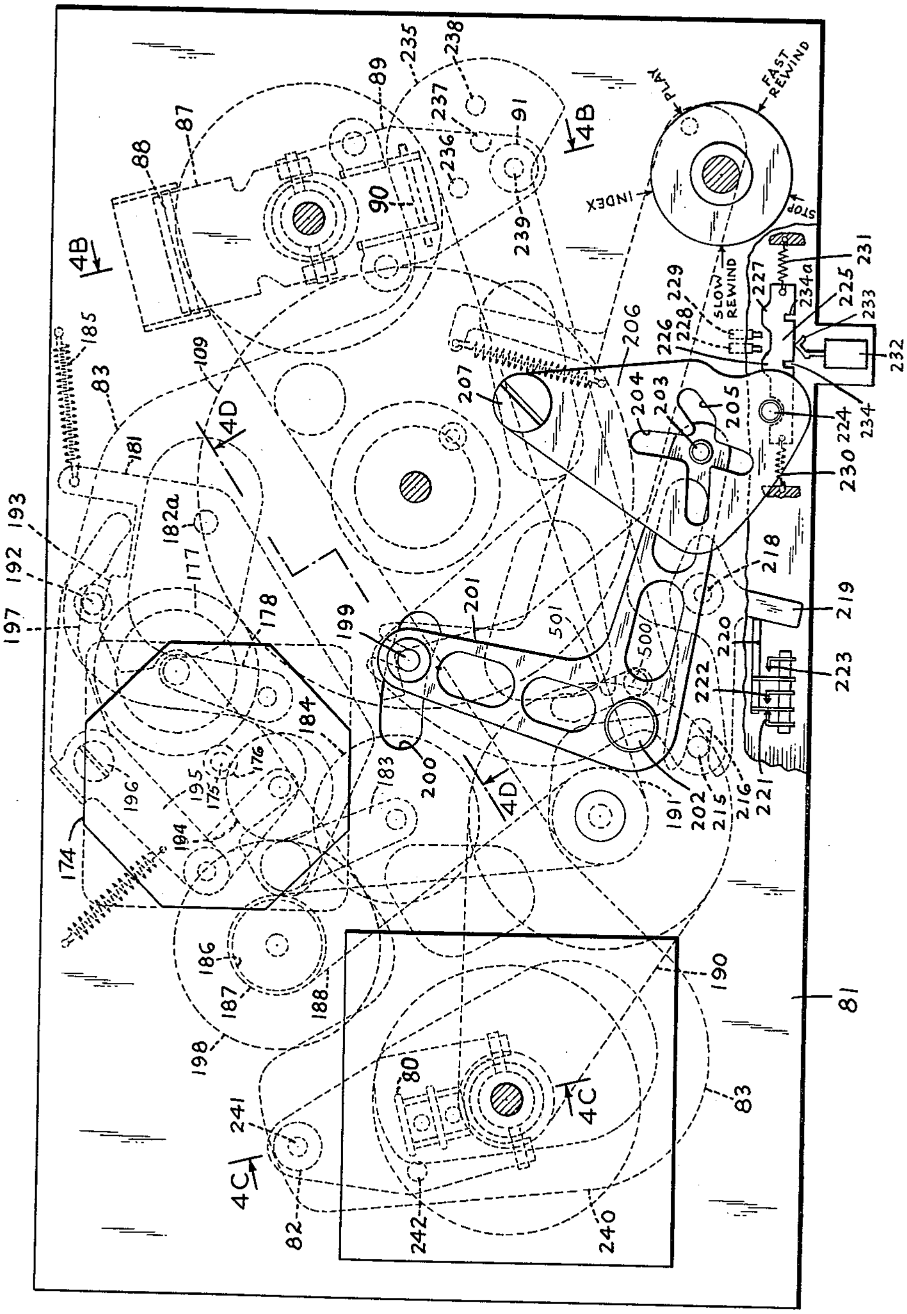
FIG. 4 is a view in horizontal section taken along the line 4—4 of FIG. 1A, looking in the direction of the arrows, and showing the mechanism in the "play" position.
Figure 4A:
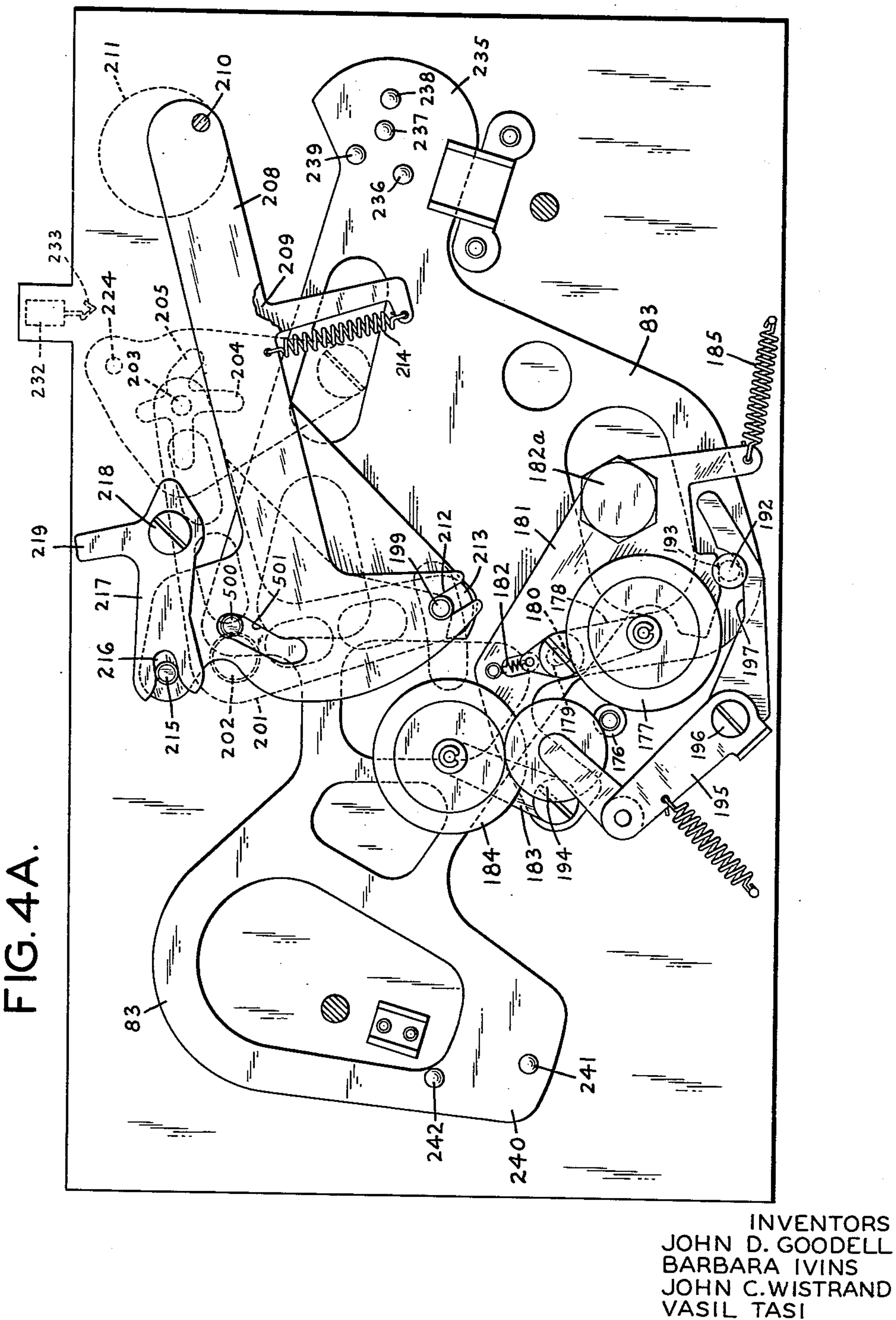
FIG. 4A is a view in horizontal section taken along the line 4A—4A of FIG. 1A, looking in the direction of the arrows, showing the underside of the clutch operating mechanism and its linkages.
Figures 1B, 1D, 4B, 4C, 4D, 5, 6B:
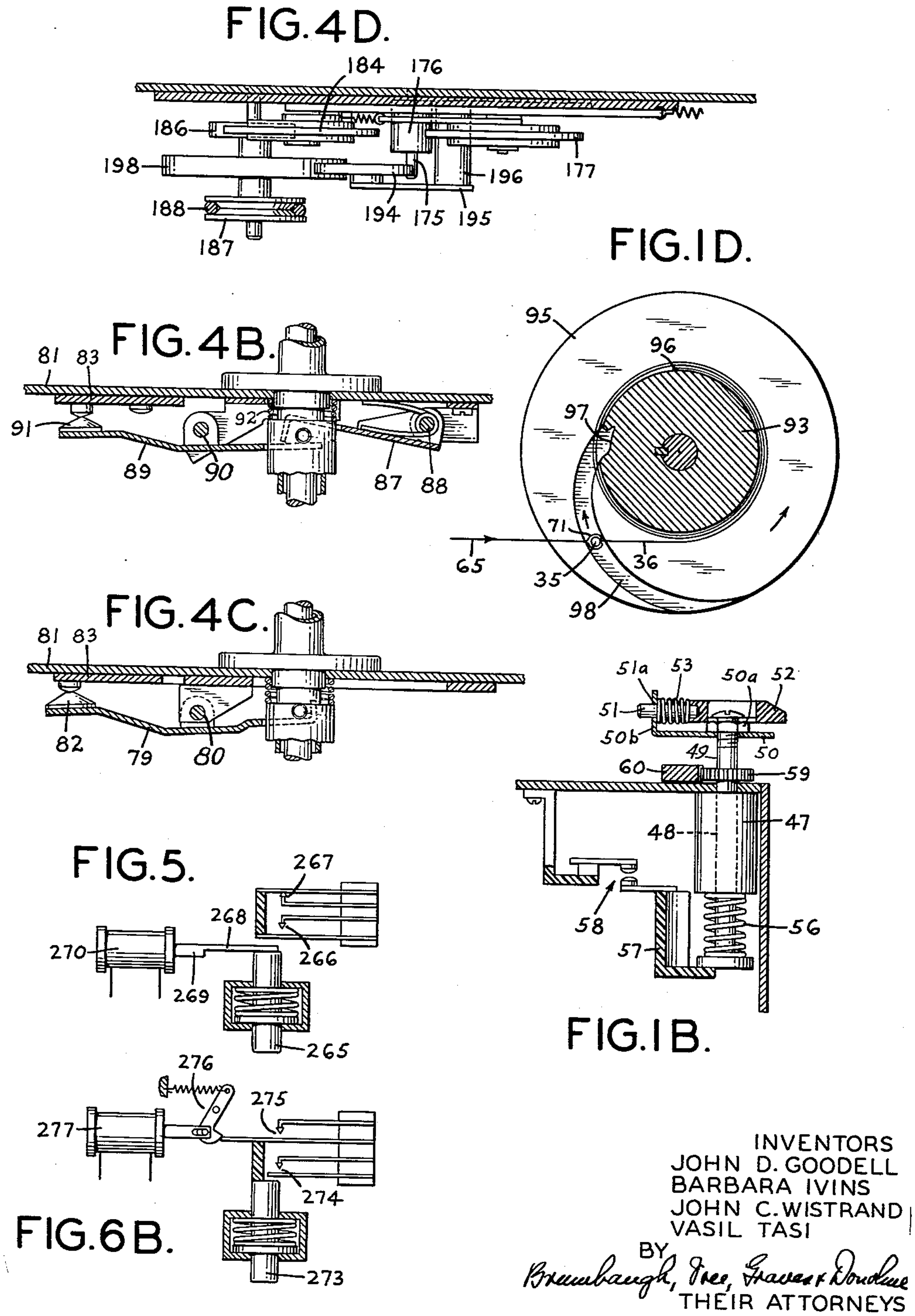
FIG. 1B is a view in vertical section taken along the line 1B—1B of FIG. 1, looking in the direction of the arrows, and showing details of the cartridge escapement mechanism.
FIG. 1D is a view in horizontal section taken along the line 1D—1D of FIG. 1A, looking in the direction of the arrows, showing details of the takeup reel but with the tape leader partially wound on the reel.
FIGS. 4B and 4C are views in vertical section taken along the lines 4B—4B and 4C—4C of FIG. 4, looking in the direction of the arrows, showing details of the rewind and takeup clutch actuating mechanism.
FIG. 4D is a view taken along the line 4D—4D of FIG. 4, looking in the direction of the arrows, illustrating details of the drive mechanism.
FIG. 5 is a schematic diagram of a "reject-release" control switch for the apparatus of FIG. 1.
FIG. 6B shows schematically one form of "record-play" switch for the apparatus of FIG. 1.

During the play cycle, the takeup reel 11 is also adapted to be driven and it is connected to the driven element 86 (FIG. 1A) of a conventional clutch mechanism 85 having a driving element 84 which is normally maintained in engagement with the driven element 86 by a spring biased fork member 87 pivotally mounted at 88 on the underside of the middle deck 81 (FIGS. 4 and 4B). A second fork member 89 also pivotally mounted at 90 on the underside of the deck 81 carries a button 91 which is adapted to be actuated by a plurality of buttons 236, 237, 238 and 239 (FIG. 4) on the plate 83 to move the fork member 89 selectively to two positions. In one position (illustrated in FIG. 4B), the fork member 89 is just disengaged from the clutch member 86 so that the latter is maintained lightly engaged with the clutch member 84 by a light clutch spring 92. In the second position of the fork member 89, the clutch members 84 and 86 are completely disengaged.

The takeup spool 11 (FIGS. 1, 1A, 1D and 1E) comprises a hub 93 having parallel opposed flanges 94 and 95. The end of the tape leader 36 is secured to the hub 93 at 96 and the hub 93 is provided with a recess 97 in which the pull member 35 coupled to the clip member 71 is adapted to be received as the leader is wound up on the hub 93. Also, the opposite inside faces of the flanges 94 and 95 are recessed as at 98 (FIG. 1D) to provide clearance for the pull member 35 in going from the periphery of the flanges to the recess 97.

The capstan 12 is connected to a shaft 106 which extends through a bore 107 in a downwardly depending post 108 secured below the top deck 10. At its lower end, the shaft 107 is secured to a conventional mechanical filter-type flywheel 109 which is adapted to be driven in a manner to be described in greater detail hereinafter.

The pressure roller assembly 13 (FIGS. 1 and 1A) includes a pressure roller 110 which is mounted on a shaft 111 journalled in elongated slots 112 and 113 formed in the sides of a support member 114 of substantially U-shaped cross-section which is pivoted on the deck 10 at 115. The pressure roller 110 is normally urged in the direction of the capstan 12 by the free ends 116*a* and 117*a* of coil springs 116 and 117 mounted on the screws 118 and 119, respectively, and having ends 120 and 121 fixed to the support member 114.

Normally, the pressure roller support member 114 is maintained away from the capstan 12 by a spring 122 (FIG. 1) which is secured to the arm 114 at 123 and to the upper deck 10 at 124. The pressure roller support member 114 is adapted to be moved into engagement with the capstan 12 by an actuator member 125 which is pivoted on a shaft 126 extending through the deck 10 and has an arm 127 carrying a roller 128 engaging the rear wall of the pressure roller support member 114. The actuator member 125 also has an arm 129 in which is formed a curved slot 130 through which extends a pin 131 carried by a slide 132. The slide 132 has an elongated slot 133 formed therein through which extends a pair of spaced apart pins 134 and 135 secured to the top deck 10. The slide 132 is connected to the plunger 136 of a solenoid 137 which is also mounted on the deck 10.

It will be understood that when the solenoid 137 is energized, the plunger 136 will be retracted, pulling with it the slide 132 and rotating the actuator member 125 about its pivot 126. This will cause the roller 128 to push the pressure roller support member 114 outwardly to bring the pressure roller 110 into engagement with the capstan 12. The actuator member 125 is designed to have an overtravel characteristic that locks the member 114 in place with the pressure roller 110 engaging the capstan 12 after the solenoid 137 has been deenergized.

The pressure roller 110 is adapted to be disengaged from the capstan 12 by means of a solenoid 138. The solenoid 138 (FIG. 1A) has a plunger 139 which is connected to a link 140 passing through an opening 141 in a lever arm 42 secured to the lower end of the shaft 126 which carries the actuator member 125.

When the solenoid 138 is energized with the actuator arm 125 in the position to maintain the pressure roller 110 in engagement with the capstan 12, the plunger 139 is withdrawn and carries with it the link 140. This pulls the arm 142 and turns the shaft 126 and the actuator member 125 thereon, permitting the pressure roller support member 114 to return to its initial position under the influence of the spring 122.

During a recording operation, the tape moving in the tape transport path is required to be maintained in engagement with the erase head 15. This is accomplished by an arm 144 pivotally mounted on the deck 10 at the point 143. The arm 144 carries a pressure pad 145 of felt or other suitable material secured to an upwardly extending lug 146 thereon. The pad 145 is normally urged in the direction of the erase head 15 by a spring 147.

During the tape threading operation, the pressure pad 141 is maintained away from the erase head 15 by an arm 148 which is pivoted at 149 and has an upwardly extending lug 150 serving as a detent to retain the pressure pad arm 144 in the disengaged position. The arm 148 also has an upwardly extending lug 151 which extends through an opening 151*a* in the lower side of the pressure roller support member 114 so that the arm 148 is linked to the support member for movement therewith.

From the foregoing, it will be apparent that when the actuator member 125 is actuated to engage the pressure roller 110 and the capstan 12, the pressure pad arm 144 is simultaneously released permitting the pressure pad 145 to urge the tape in the tape transport path against the erase head 15.

A linkage 152 connects one end 153 of the support member 114 to an arm 154 pivotally mounted at 155 on the top deck 10 and which carries a tape guide member 156. The tape guide member 156 functions to pull the tape away from the reproducing-recording head when the pressure roller 114 is away from the capstan 12, as in the rewind cycle, for example.

The support member 114 also carries a switch actuator 157 (FIG. 1F) which, for the disengaged position of the capstan 12 and pressure roller 110, maintains the switches 158 and 160*a* normally closed and the switches 159, 160 and 312 normally open. When the support member 114 is moved to bring the pressure roller 110 into engagement with the capstan 12, the switches 158 and 160*a* are opened while the switches 159, 160 and 312 are closed. The functioning of these switches affects conditions in a system for controlling the apparatus as described in greater detail below.

The recording-reproducing head assembly 14 comprises a magnetic recording-reproducing head 161 which preferably is of the type disclosed in the copending application of Benjamin B. Bauer and Harvey Sherman, filed May 22, 1959, Serial No. 815,150, for "Tape Recording-Playback Head." The head 161 is pivotally mounted on the arms 162 and 163 of a U-shaped member having a base 164 and it is adjustable about a substantially horizontal axis so that its gap or gaps may be brought into parallelism with the tape. To this end, the head 161 may be urged by means such as a spring (not shown), for example, against an adjustable stop formed by a set screw 168 threaded through the base 164.

The base 164 is secured to a hollow shaft 165 which is journalled in a bearing 166 formed in an upwardly extending block 167 mounted on the deck 10. A slot 166*a* extends laterally from the bearing 166 to the side edge of the block 167, the width of which is adapted to be adjusted by a screw 167*a* threaded into the block 167. By adjustment of the screw 167*a*, the friction between the shaft 165 and the bearing 166 can be adjusted or the shaft 165 can be clamped in a fixed position, as desired.

The base 164 also has an extension 169 (FIGS. 1 and 2) which is bored at 170 to receive a shaft 171. The lower end of the shaft 171 is threaded into a bore 172 in the block 167 and the upper end carries a knob 173. The underside of the knob 173 serves as a stop against which the base extension 169 is normally urged by a spring 169*a*. By adjustment of the knob 173, the air gap or gaps in the magnetic recording-reproducing head 161 can be skewed relatively to the tape to provide a tone control action as described in the copending application of Peter C. Goldmark, Serial No. 746,810, filed July 7, 1958, for "Magnetic Recording Apparatus."

Power for driving the several shafts in the apparatus is provided by a single electric motor 174 (FIG. 1A) which is secured to the middle deck 81. The motor 174 has a drive shaft 175 on which is secured a drive roller 176.

The capstan flywheel 109 is adapted to be driven from the motor drive roller 176 through an idler wheel 177 (FIGS. 1A, 4, 4A and 4D). The idler wheel 177 is carried by an arm 178 having a slot 179 formed therein through which a pin 180 extends to secure the arm 178 movable to an idler assembly plate 181. The idler wheel 177 is normally maintained in a reference position by means of a spring 182 which is secured at one end to the arm 178 and at the other end to the idler assembly plate 181.

The idler assembly plate 181 is pivotally mounted under the middle deck 81 at the point 182*a* and it carries a pivotally mounted arm 183 on which is mounted a second idler wheel 184. A spring 185 connected to the idler assembly plate 181 and to the middle deck 81 normally urges the assembly plate 181 in the direction to bring the several idlers into the proper driving relationship. The idler 177 is adapted to drive the flywheel 109 from the motor drive roller 176, while the idler 184 is adapted to drive an idler wheel 186 from the drive roller 176. The wheel 186 has a pulley 187 which is coupled by a belt 188 to a pulley 189 which in turn is coupled by belts 190 and 191 to the driving element 76 of the clutch 77 and to the driving element 84 of the clutch 85, respectively.

The idler assembly plate 181 is adapted to be pivoted about the point 182*a* as required to drive the several shafts at the appropriate speeds during the operating cycles. This is accomplished by a button 192 (FIG. 4) carried by the plate 83 which is adapted to cooperate with a cam surface 193 formed on the idler assembly plate 181, as described in detail hereinafter.

Low speed drive of the pulley 187 is adapted to be effected by an idler wheel 194 mounted on an arm 195 pivoted at a point 196 under the middle deck 81 and having a cam follower arm 197 adapted to be actuated by the button 192 on the plate 83, as described in greater detail below. The wheel 194 is adapted to be driven by the motor shaft 175 and to drive a wheel 198 mounted on the same shaft as the pulley 187.

The plate 83 has the general outline shown in FIG. 4 and it is provided with a centrally located pin 199 which extends through an arcuate slot 200 formed in the middle deck 81 and is secured to one arm of a bell crank mechanism 201 pivoted above the deck 81 at the point 202. The other arm of the bell crank 201 carries a pin 203 which is slidable in generally vertical and generally horizontal slots 204 and 205, respectively, formed in a plate 206 which is pivotally secured on top of the middle deck 81 at the point 207.

The plate 83 is adapted to be positioned by cooperating link members 208 and 209 (FIGURE 4A) which are both pivotally mounted at 210 on a programming wheel 211 which is adapted to be stepped selectively to five different positions by mechanism to be described below. The link 208 is provided with a slot 212 in which the pin 199 on the plate 83 is adapted to be received while the link 209 has a hook 213 which retains the pin 199 in the slot 212, the links 208 and 209 being urged together by a spring 214 for this purpose. The plate 83 is also connected to the link 208 by a pin 500 which is received in a slot 501 in the link 208 as best shown in FIGS. 4 and 4A.

The link member 208 also carries a pin 215 which is received in a slot 216 formed in an actuator member 217 pivoted at the point 218 beneath the middle deck 81 and provided with an actuator arm 219. The actuator arm 219 is adapted to be operated manually to disengage the main cam 83 from the stepping mechanism during the search cycle, as will be described in greater detail hereinafter.

The actuator arm 219 carries a switch actuator 220 (FIG. 4) which for all states of the machine other than "searching" maintains a switch 221 normally closed and the switches 222 and 223 normally open. When the actuator arm 219 is moved to initiate a "searching" operation, the switch actuator 220 operates to close the switches 222 and 223 and to open the switch 221 as required to effect control of the apparatus in a desired manner, as described below.

By adjustment of the position of the link 206, "searching" may be effected either in the "forward" or the "reverse" direction. Thus, the link is provided with an actuator pin 224 which is moved to the right in "forward searching" and to the left in "reverse searching." The pin 224 is coupled to a translatable link 225 carrying spaced apart actuators 226 and 227 which are positioned to close momentarily a switch 228 and to close a switch 229 when moved either to the "forward" or "reverse" position. These switches form part of the control system for the apparatus as described in greater detail hereinafter.

The link 225 is maintained in the rest position shown in FIG. 4 by means such as centering springs 230 and 231. Also, the link 225 is adapted to be releasably locked in either the "forward" or "reverse" position by a spring detent 233 which is adapted to be received either in the slot 234 or the slot 234*a* for this purpose. The detent 233 is adapted to be released automatically by a solenoid 232 in the event "forward" or "reverse" searching is inadvertently carried to either end of the tape, as will be described in greater detail below.

The plate 83 has one lobe 235 (FIG. 4A) to the underside of which are secured a plurality of buttons 236, 237, 238 and 239 which serve to actuate the fork 89 for disengaging the takeup reel clutch member 84 (FIG. 1A) at the proper times in the operating cycle. The plate 83 also has a lobe 240 which carries the buttons 241 and 242 on the underside thereof. The buttons 241 and 242 are adapted to actuate the fork member 79 to disengage the clutch driven member 76 from the driving member 78 as required for driving the cartridge hub during the rewind cycle as described in detail hereinafter. Also, as described above, the plate 83 carries a button 192 which is adapted to cooperate with the cam surface 193 on the idler assembly plate 181 and with the cam follower arm 197 to move the several idler wheels as required to adjust the speed of the several rotating mechanisms during the different stages of the operating cycle.

The programming wheel 211 (FIGS. 1 and 2) which moves the plate 83 includes a cam 243 having angularly spaced apart notches 244 formed therein to open and close sequentially a pair of switches 245 and 245*a* mounted on the middle deck 81. The cam 243 is adapted to be rotated by a shaft 246 driven from a gear reduction mechanism 247 powered by an electric motor 248. The motor shaft 249 carries a wheel 250 which normally is braked by a pad 251 on the plunger 252 of a solenoid 253. The motor 248 and the solenoid 253 are both energized through circuits including the switches 245 and 245*a*, as described in greater detail below.

The shaft 246 also drives through gearing 254 a stepping switch 255 which prepares and completes control circuits for automatic operation of the apparatus.

For automatic operation, it is necessary to know when the tape has reached the takeup spool 11 and is ready to be played. Also, some means should be provided to indicate when the end of the tape has been reached. This is accomplished according to the invention by the mechanism shown in FIG. 1A which includes a worm gear 256 on the cartridge rewind shaft 20 which drives gearing including an idler gear 257 engaging a gear 258. The takeup reel shaft is also provided with a worm gear 259 which drives gearing including an idler gear 260 engaging a gear 261. The gear 261 carries a switch contact 262 which is adapted to engage a fixed contact 263 when the beginning of the tape has reached the takeup spool 11 and the tape is in the proper position to be played. The gear 261 also carries a second switch contact 264*a*. The gear 258 is mounted directly below the gear 261 and it carries a switch contact 264*b* which is positioned to engage the contact 264*a* at predetermined relative positions of the gears 261 and 258.

The position of the contacts 264*a* and 264*b* is such that at the beginning of the "play" cycle they are engaged. As the tape is played, the contact 264*a* moves away from the contact 264*b* until half the tape in the cartridge 63 has been played. The contact 264*b* then begins to overtake the contact 264*a* until at the end of the tape the two contacts come into engagement, signalling that the end of the tape has been reached. It will be noted that this action is independent of the amount of tape in the cartridge originally.

The apparatus also embodies means enabling any cartridge then in the tape transport position to be rejected during the "index" cycle. This is accomplished by actuating a pushbutton 265 (FIG. 5) to close a normally open swtich 266 and to open the normally closed switches 267 and 267*a* in the control system to be described below. Actuation of the pushbutton 265 during any other cycle is prevented by a stop member 268 on the plunger 269 of a relay 270 which is adapted to be energized only during the "index" cycle.

*Operation*

In operation, a stack of cartridges 63 is placed on the loading platform 26 and is pressed downwardly against the spring 27 into the loading well 16. When the pressure is released from the cartridges, the top cartridge in the stack is automatically positioned in the proper location for the operations involved in transporting the tape past the magnetic playback head 161, winding it up on the takeup spool 11, and rewinding it back into the cartridge 63 at the respectively correct speeds. When this sequence of events has been completed, the escapement mechanism 45 allows the stack of cartridges to move upwardly in such manner that the next cartridge is indexed into the "play" position and the playing cycle is repeated.

In order to perform the operations involved in the cycle of events outlined above, it is necessary to control the engagement of the various clutches, speed control mechanisms, and associated devices in accordance with a specific sequential program. In the illustrative control system described herein, the basic control circuitry and mechanisms are stepped through five states designated, respectively, the "index" condition, the "play" condition, the "fast rewind" condition, the "stop" condition, and the "slow rewind" condition, in that order.

Various conditions that must be established in this sequence of events are caused to take place by repetitively energizing the indexing motor 248 (FIG. 2) and the brake release solenoid 253 to actuate simultaneously the program wheel 211 and the stepping switch 255 mechanically coupled thereto. The switch 255 is provided with a multiplicity of electrical contacts for preparing and completing the necessary electrical circuits. The program wheel 211 and the stepping switch 255 are both cycled through the five successive states repetitively, and they are locked together so that they cannot get out of step.

For purposes of convenience, and in order to increase the versatility of the apparatus, provision is made whereby the cycle may be interrupted at certain times to cause the mechanism to perform in a modified manner for a short time. For example, during the play cycle, it may be desired to cause the tape to be transported briefly at higher than normal speed either "forward" or "reverse" in order to "search" for particular signals recorded thereon. At the end of such an interruption to the programmed cycle, the machine automatically is left in such condition that the nomal automated cycle may be continued upon command without the operating condition having been disrupted.

Figure 6:
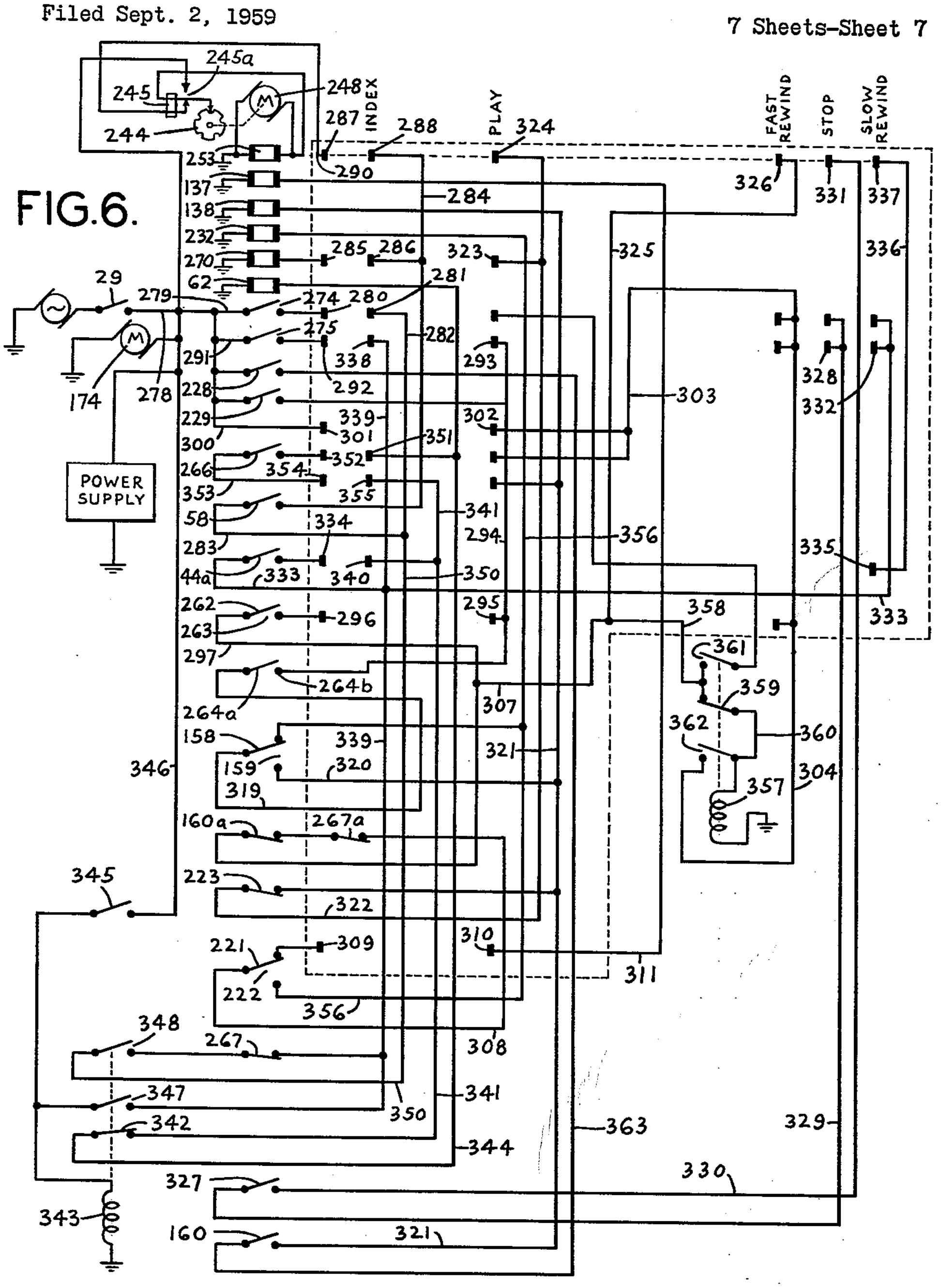
FIGS. 6 and 6A are typical circuits for operating the apparatus shown in FIG. 1.

A representative control system for causing the apparatus shown in FIG. 1 to perform the operations outlined above is illustrated in FIG. 6. For convenience, this system will be described below in terms of the functions it performs during the course of an operating cycle.

Figure 6A:
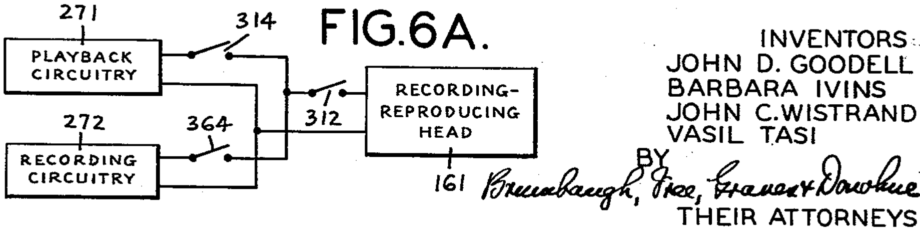

In a typical operation, assume that the machine is in the rest position with the idlers 184, 177 and 194 all disengaged, and that a stack of cartridges 63 has been placed on the platform 26 and that the platform has been pressed down into the cartridge loading well 16. Movement of the platform 26 from its stop permits the normally open main switch 29 to close which connects the drive motor 174 (FIG. 1A) to the power mains and also energizes the power supply for the playback circuitry 271 (FIG. 6A) and for the recording circuitry 272. When the stack of cartridges is released, the spring 27 (FIG. 1A) urges the platform 26 upwardly until the cartridge 63 in the playing position is brought to rest against the escapement detent 52. This lifts the shaft 49 (FIG. 1B) and closes the switch 58 indicating the presence of a cartridge in the tape transport position.

The operating cycle is then initiated by the operator manually depressing a "play" button 273 (FIGS. 6 and 6B) to close the switches 274 and 275. The switch 274 remains closed only so long as the button 273 is depressed but the switch 275 is held closed by a spring biased latch 276 after the button 273 is released and is not opened until the latch 276 is released by energization of a solenoid 277.

Closing of the switch 274 completes a circuit which is traced from the power line 278 through a conductor 279, a contact 280 engaging the "index" position contact 281 of the stepping switch 255, the conductors 282 and 283, the closed switch 58 (FIGS. 6 and 1B), a conductor 284, the engaged stepping switch contacts 285, 286 to the reject release solenoid 270, respectively, which is thereby energized. Energization of the "reject" release solenoid 270 withdraws the stop member 268 (FIG. 5) so that the "reject" button 265 can be depressed, if desired.

A circuit is also completed from the conductor 284 through the engaged stepping switch contacts 287 and 288, a conductor 290, the closed switch contacts 245 and the indexing motor 248 and its brake release solenoid 253. Energization of the indexing motor 248 moves the stepping switch 255 and the program wheel 211 (FIG. 4) from their initial "index" positions to the "play" positions.

Rotation of the indexing cam 244 by the motor 248 opens the contacts 245 and closes the contacts 245*a* which connect the motor 248 directly to the power line 278. Hence, even though the "play" button 273 is immediately released, the motor 248 continues to rotate until the cam 244 arrives at the "play" position, at which time the switch 245*a* is opened and the switch 245 is closed.

Movement of the program wheel 211 positions the plate 83 in the "play" position shown in FIGS. 4 and 4A, in which the clutch operating fork 79 is depressed by the button 241 so that the rewind clutch 77 (FIG. 1A) is disengaged; the clutch operating fork 89 is partly depressed by the button 239 so that the clutch 85 is lightly engaged; and the arm 197 and idler assembly plate 181 are positioned by the button 192 so that the capstan 12 is driven through the idler 177 and the flywheel 109 to transport the tape at a speed of, say 1⅞" per second, while the takeup spool clutch driving member 84 is driven at a speed of, say ¾ revolution per second through the slow speed idler 194 engaging the wheel 198. This causes the takeup spool 11 to begin to rotate in the direction to wind up the tape leader 36. The pull member 35 (FIG. 1C) on the end of the leader 36 is now pulled away from its initial position and carries with it the coupling member 71 on the end of the tape 65 in the cartridge 63 on the platform 26 then in the playing position.

After the tape 65 has reached the takeup reel 11, the contacts 262 and 263 (FIGS. 1A and 6) are engaged. This completes a circuit which is traced from the power line 278 through a conductor 291, the closed switch 275, the engaged stepping switch contacts 292 and 293, a conductor 294, the engaged stepping switch contacts 295 and 296, the engaged contacts 262 and 263, a conductor 297, a conductor 307, the switch 160*a* which is normally held closed by the pressure roller assembly 114 when the pressure roller 110 is out of engagement with the capstan 12 (FIG. 1F), the normally closed "reject" switch 267*a*, a conductor 308, the normally closed "search" switch 221 (FIG. 4), the engaged stepping switch contacts 309 and 310, a conductor 311, and the head and capstan pressure solenoid 137 to ground.

Energization of the solenoid 137 causes the pressure roller 110 to engage the capstan 12 as described above (FIG. 1) which now drives the tape 65 at the correct constant speed (e.g., 1⅞" per second) for reproducing the signals recorded thereon. As stated, the pressure roller linkage has an over-travel characteristic that locks the pressure roller 110 in place against the capstan so that it is not necessary for the solenoid 137 to be energized more than momentarily.

Movement of the pressure roller assembly 114 to bring the pressure roller 110 into engagement with the capstan 12 opens the switch 160*a* (FIG. 1F) which deenergizes the solenoid 137. At the same time, the pressure roller support member 114 closes a switch 312 (FIGS. 1F and 6A) which completes the electrical circuit from the playback head 161 to the playback circuitry 271. Since the switch 314 in the circuit between the head 161 and the playback circuitry 271 was closed at the time the system was positioned in the "play" cycle, the signal recorded on the tape 65 will now be reproduced.

If the tape 65 is played all the way through, the tape end signalling contacts 264*a* and 264*b* (FIG. 1A) are eventually engaged, completing a circuit which is traced from the power line 278 through the engaged stepping switch contacts 292 and 293, the conductor 294, the engaged contacts 264*a* and 264*b*, a conductor 319, the switch 159 (FIG. 1F) which is now closed, the conductors 320 and 321 to the capstan pressure release solenoid 138.

The solenoid 138 is now energized, causing the pressure roller 110 (FIG. 1) to be disengaged from the capstan 12 in the manner described above. This action simultaneously opens the switch 159 so that the solenoid 138 is thus deenergized, and closes the switch 158 (FIG. 1F).

A circuit is also completed at this time from the conductor 321 through the normally closed search switch 223, a conductor 322, the stepping switch contacts 323 and 324 engaging the stepping switch contacts 285 and 287, respectively, so that the indexing motor 248 and the "reject" release solenoid 270 are again energized.

Energization of the brake release solenoid 253 and with it the motor 248 advances the program wheel 211 (FIG. 4) and the stepping switch 255 from the "play" position to the "fast rewind" position. This adjusts the position of the plate 83 to cause the cartridge hub drive clutch 77 to be fully engaged to drive the shaft 20 (FIG. 1A); the clutch 85 to be disengaged by the action of the button 237 on the fork 89 (FIG. 4) so that the takeup spool 11 is no longer driven; and the slow speed idler arm 195 and the idler assembly plate 181 to be positioned by the button 192 so that the slow speed idler 194 is disengaged while the wheel 186 is driven through the idler 184 to drive the rewind shaft 20 at a speed of, say, forty-two revolutions per second.

The tape in the cartridge then in the playing position is now rewound on the spool at high speed until the tape location contacts 262 and 263 (FIG. 1A) are again engaged. When this occurs, a circuit is completed which energizes the indexing motor 248 and its brake release solenoid 253 through the conductors 297, 307 and 325 and the engaged stepping switch contacts 326 and 287. This steps the program wheel 211 and the stepping switch 255 along from the "fast rewind" position to the "stop" position. In this position, the location of the plate 83 is such that all of the idlers are disengaged so that the tape begins to slow down.

When the speed of the tape 65 has been slowed down considerably, but before the tape comes to rest, a centrifugal switch 327 (FIGS. 1 and 6) on the takeup spool 11 closes. This completes a circuit from the power line 278 through the engaged stepping switch contacts 292 and 328, a conductor 329, the closed centrifugal switch 327, a conductor 330, the engaged stepping switch contacts 331 and 287, to the indexing motor 248 and its brake release solenoid 253 which are thus energized.

Energization of the indexing motor 248 advances the program wheel 211 and the stepping switch 255 from the "stop" position to the "slow rewind" position. This positions the cam 83 so that the clutch 77 (FIG. 1A) and the slow speed idler 194 are engaged so that the rewind shaft 20 is now driven at slow speed.

Figure 1C:
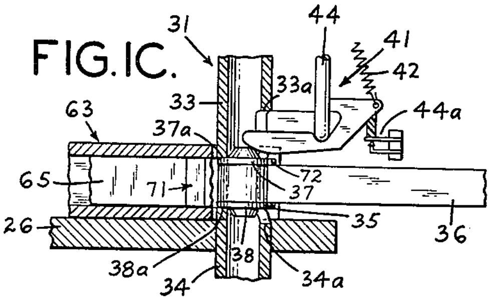
FIG. 1C is a view in vertical section taken along the line 1C—1C of FIG. 1, looking in the direction of the arrows, showing details of the tape threading mechanism.

In the "slow rewind" condition, the tape 65 is transported at a moderate speed back into the cartridge 63. When the pull member 35 on the leader 36 on the takeup spool 11 returns to its initial position coaxially with the guide post 31, it closes the switch 44*a* (FIG. 1C). This completes a circuit which is traced from the power line 278, through the closed switch 275, the engaged stepping switch contacts 292 and 332, a conductor 333, the closed switch 44*a*, the engaged stepping switch contacts 334 and 335, a conductor 336, the engaged stepping switch contacts 337 and 287 to the indexing motor 248, energizing the latter and its brake release solenoid 253.

The indexing motor 248 now steps the program wheel 211 and the stepping switch 255 from the "slow rewind" state to the "index" state, thus restoring the several clutches and idlers to their initial positions described above.

The cycle has now been completed except that power continues to be supplied through the switch 275. A circuit is now completed from the switch 275, through the engaged stepping switch contacts 292 and 338, the conductors 339 and 333, the closed switch 44*a*, the engaged stepping switch contacts 334 and 340, a conductor 341, the normally closed contacts 342 on a relay 343, a conductor 344, and the escapement solenoid 62 to ground, thus energizing the escapement solenoid 62 (FIG. 1).

Energization of the solenoid 62 causes its plunger 61 to be retracted to rotate the shaft 49 as required to index the cartridges 63 on the platform 26 one position upwardly to bring the next cartridge into the tape transport position.

The operation of the escapement solenoid 62 also closes a switch 345 (FIG. 1) which momentarily energizes the relay 343 directly from the power line 278 over the conductor 346.

Upon energization of the relay 343, its normally closed contacts 342 are opened and its contacts 347 and 348 are closed. The opening of the contacts 342 deenergizes the escapement solenoid 62.

The closing of the relay contacts 347 latches the relay 343 by connecting it via the conductor 339, the engaged stepping switch contacts 338 and 292, the closed switch 275 and the conductor 291 to the power line 278.

The closing of the relay contacts 348 energizes the indexing motor 248 over a circuit which is traced from the conductor 290, the engaged stepping switch contacts 287 and 288, the conductor 284, the closed switch 58, the conductor 283, a conductor 350, the closed relay contacts 348, the normally closed "reject" switch 267 (FIG. 5), the conductor 339 and the engaged stepping switch contacts 338 and 292, the closed switch 275 and the conductor 291 to the power line 278.

Energization of the indexing motor 248 and its brake release solenoid again steps the program wheel 211 and the stepping switch 255 from the "index" position to the "play" position and for play the sequence of operations is repeated as described above.

In the event it is desired to skip the cartridge which is about to be moved into the tape transport position during the "index" portion of the operating cycle, the reject button 265 is depressed manually upon termination of the "fast rewind" cycle (the "reject release" solenoid 270 is energized at the same time as the indexing motor 248 so that the stop member 268 on the solenoid plunger 269 (FIG. 5) is withdrawn) and this closes the switch 266 and opens the switch 267.

The opening of the switch 267 breaks the circuit to the indexing motor 248.

The closing of the switch 266 completes a circuit to energize the escapement solenoid 62 (FIG. 1) which is traced through the conductor 344, the engaged stepping switch contacts 351 and 352, the closed "reject" switch 266, a conductor 353, the engaged stepping switch contacts 354 and 355, the conductor 341, the engaged stepping switch contacts 340 and 334, the closed switch 44*a* (FIGS. 6 and 1C), the conductor 333, the conductor 339, the engaged stepping switch contacts 338 and 292, the closed switch 275, and the conductor 291 to the power line 278. The escapement mechanism 45 (FIG. 1) is, therefore, again operated to index the stack of cartridges 63 on the platform 26 to bring the next cartridge 63 into the tape transport position. The "reject" button is now released and the normal operating cycle is resumed.

As stated above, the apparatus includes means operable during the "play" cycle for transporting the tape in either direction at high speed while searching for a desired recording thereon. For "forward or reverse searching" during the "play" cycle, the actuator arm 219 (FIG. 4) is manually moved to the right. This disengages the cam 83 from the program wheel 211 and moves the pin 500 on the plate 83 to a position coaxial with the axis of rotation 202 of the bell crank 201. Simultaneously, the actuator 220 opens the switch contacts 221 and closes the switch contacts 222 and 223.

For "forward" searching, the pin 224 and the link 206 are moved to the right in FIG. 4 and are retained in this position by the detent 233 on the solenoid 232 which enters the slot 234 in the link 225. The cam 226 on the link momentarily closes the switch 228 and closes the switch 229.

Momentary closing of the switch 228 (FIG. 4) by the cam 226 completes a circuit which is traced through a conductor 363, the closed switch contacts 160 (FIGS. 1F and 6) and the conductor 321 to the capstan pressure release solenoid 138. The latter is thus energized so that the pressure roller 110 is moved out of engagement with the capstan 12 while the tape guide member 156 moves the tape out of engagement with the reproducing head 161.

Movement of the link 206 to the right moves the plate 83 to adjust the drive mechanism to drive the takeup spool 11 at a speed of, say, 5½ revolutions per second in the forward direction.

When the desired recording on the tape 65 has been located, the actuator arm 219 and the link 225 (FIG. 4) are restored to their initial positions, closing the switch contacts 221 and opening the switch contacts 222 and 223.

It will be noted that at the time the tape position locating contacts 262 and 263 (FIG. 1A) were engaged, the relay 357 (FIG. 6) was energized through a circuit including the conductors 307 and 358, the normally closed relay contacts 359 and the conductor 360. Upon energization, the contacts 359 were opened and the contacts 361 and 362 were closed.

The closing of the contacts 362 maintained the relay 357 energized by connecting it directly to the conductor 304.

The closing of the contacts 361 maintained a circuit ready for operating the capstan pressure solenoid 137 at the conclusion of a "searching operation," as described below.

Accordingly, when the "play" button 273 (FIG. 6B) is again depressed to close the switch contacts 274, a circuit is completed through the closed relay contacts 361 to energize the capstan pressure solenoid 137. This engages the pressure roller 110 (FIG. 1) and the capstan 12 so that the tape is again transported at normal speed.

For "search" in the reverse direction, the actuator 219 is manually operated while the link 225 is moved to the left. Operation is essentially as described above for "forward searching."

The "forward reverse" release solenoid 232 serves to limit a search operation in either direction to the limits of the tape. Thus, if a "forward" searching operation is continued to the end of the tape, the contacts 264*a* and 264*b* will close and complete a circuit to energize the solenoid 232. This will withdraw the detent 233 so that the link 206 will be restored to its initial position under the influence of the centering springs 230 and 231 allowing the tape to come to rest.

Similarly, if "reverse" searching is inadvertently carried too far, the tape start locating contacts 264*a* and 264*b* (FIG. 1A) will close, completing the circuit to energize the "forward reverse" release solenoid 232 so that the tape will come to rest.

The apparatus described above may be used for recording instead of for reproducing, in which case the switch 314 is opened and a switch 364 is closed to connect the head 161 to the source 272 of program material to be recorded. Otherwise, operation is substantially the same as for reproducing.

After the last cartridge has been played or recorded, the platform 26 rises to its topmost position in which the arm 28 opens the switch 29 (FIGS. 1A and 6) which disconnects the power line 278 from the mains so that the apparatus comes to rest. This deenergizes the solenoid 277 (FIG. 6B), releasing the switch contacts 275.

Figures 2, 3, 3A, 3C:
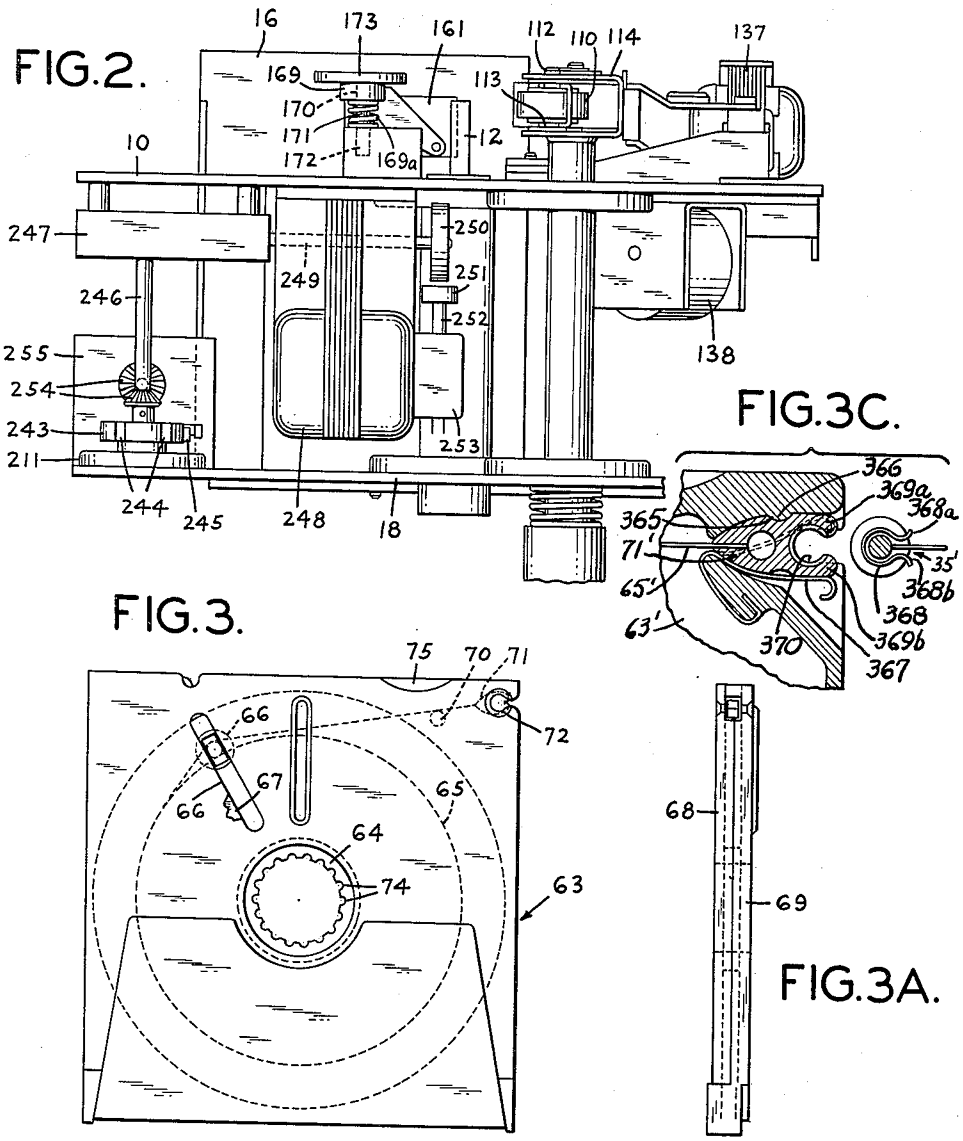
FIG. 2 is a right end view of the apparatus shown in FIG. 1.
FIGS. 3 and 3A are views in plan and elevation, respectively, of a magnetic tape cartridge constructed according to the invention.
FIG. 3C is a partial view in transverse section of a modified form of cartridge and of a take-up spool leader pull member adapted for use therewith.

FIG. 3C shows a modified form of cartridge which includes means for guiding the tape end portion smoothly to its normal initial position. In this embodiment, the tape 65′ terminates in a coupling member 71′ made of a suitable rigid material such as a plastic material, for example. The coupling member 71′ is provided with an upper surface which conforms in shape to an adjacent surface in the coupling 63'. Also, the coupling member 71' has a recess 365 formed therein into which a protuberance 366 on the adjacent cartridge wall is adapted to be snugly received. A leaf spring 367 secured within the cartridge 63' normally urges the coupling member 71' upwardly so that it is releasably locked in place by the protuberance 366 extending into the recess 365.

When the coupling member 71' is out of its recess in the cartridge 65', the spring 367 assumes the position shown in dotted lines in FIG. 3C. In this position, it cooperates with the adjacent wall of the cartridge to form a guide which guides the tape end and the coupling member 71' smoothly to the normal initial position shown in the figure.

Where a coupling member 71' of the type shown in FIG. 3C is used, the pull member 35' should preferably be provided with a spring member 368 having ears 368*a* and 368*b* shaped to conform generally to corresponding horns 369*a* and 369*b* on the coupling member 71'. The opposite sides of the coupling member 71' bounding a bore 370 formed therein are preferably bevelled as shown so that the cartridges can readily pass the spring member 368 in being threaded on the threading post 31. The spring member 368 should be suitably sized so that the ears 368*a* and 368*b* thereon will be urged against the inside surfaces of the horns 369*a* and 369*b* of the coupling member 71' in the tape transport position, so as to couple the pull member 35' securely to the coupling member 71'.

The invention thus provides highly effective apparatus for recording or reproducing with a sequence of magnetic tapes. By virtue of the novel tape threading mechanism disclosed, tape may be automatically unwound from and rewound upon a hub in a cartridge. Moreover, by reason of the novel feeding mechanism and control system described, completely automatic operation is effected.

The illustrative embodiment described above and shown in the drawings is obviously susceptible of modification in form and detail within the spirit of the invention. For example, instead of using contacts 264*a*, 264*b* and 262, 263 in FIG. 1A. Microswitches and cooperating switch actuators might be employed. Also, the arrival of the tape at start and end positions might be indicated by driving parallelly disposed lead screws from the gearings 256 and 262, respectively, one screw having a nut carrying a microswitch and the other screw having a nut carrying an actuator for the switch. Other modifications will be apparent to those skilled in the art. The invention, therefore, is intended to encompass all modifications falling within the scope of the following claims.

We claim:

1. In tape recording-reproducing apparatus, the combination of means forming a tape cartridge receiving well capable of containing a stack of tape cartridges therein, platform means slidably mounted in said well and capable of supporting said stack of tape cartridges thereon, means urging said platform means upwardly in said well, and means operable to index tape cartridges in said stack on said platform successively to and out of a reference position, while said tape cartridges remain in said stack.

2. In tape recording-reproducing apparatus, the combination of means forming a tape cartridge receiving well, upstanding guide means centrally disposed in said well, platform means slidably mounted on said guide means, means surging said platform means upwardly in said well, indexing detent means adapted to cooperate with a cartridge on said platform means to retain the same at a predetermined level, and means for moving said detent means to release said cartridge and to retain another cartridge at said predetermined level.

3. Cartridge indexing mechanism comprising a shaft mounted for movement between upper and lower limits, means normally urging said shaft towards said lower limit, a support member carried by said shaft, laterally movable detent means mounted on said support member, means normally urging said detent means into detenting position, and means for turning said shaft to effect an indexing operation.

4. Cartridge indexing mechanism comprising platform means adapted to carry a stack of cartridges, means normally urging said platform means upwardly, a shaft mounted for movement between upper and lower limits, means normally urging said shaft towards said lower limit, a support member carried by said shaft, laterally movable detent means mounted on said support member, means normally urging said detent means into detenting relation with a cartridge on said platform means, means for turning said shaft to effect an indexing operation, and signalling means rendered operative when said shaft is moved to its upper limit.

5. In tape recording-reproducing apparatus, the combination of a tape cartridge receiving well capable of containing a stack of tape cartridges therein, a platform movable between upper and lower limits in said well and capable of supporting said stack of tape cartridges thereon, electrical control means for controlling the movement of said platform to position tape cartridges in said stack selectively to a reference position, and switching means rendered operative when said platform is moved away from its upper limit for preparing said control means for operation.

6. In tape recording-reproducing apparatus, the combination of means forming a tape cartridge receiving well, platform means slidably mounted in said well, means urging said platform means upwardly in said well, means operable to index tape cartridges on said platform means successively to a reference position, tape supply reel drive means in said well, tape takeup reel drive means, motive means, a plurality of clutch means actuatable to drive said tape supply reel drive means and said tape takeup reel drive means, actuator means for operating said clutch means, programming means movable to adjust the position of said actuator means, stepping switch means synchronized with said programming means, and control circuit means including said stepping switch means for automatically operating said indexing means, said programming means and said stepping switch means in a predetermined operating cycle.

7. In tape recording-reproducing apparatus, the combination of means forming a tape cartridge receiving well, platform means slidably mounted in said well, means urging said platform means upwardly in said well, means operable to index tape cartridges on said platform successively to a reference position, automatic means for performing a predetermined cycle of operation with a cartridge indexed to said reference position, and means operable during said cycle for causing said indexing means to skip a cartridge on said platform.

8. In tape recording-reproducing apparatus, the combination of means forming a tape cartridge receiving well, platform means slidably mounted in said well, means urging said platform means upwardly in said well, means operable to index tape cartridges on said platform means successively to a reference position, automatic means for performing a predetermined cycle of operation with a cartridge indexed to said reference position, means operable during said cycle for causing said indexing means to skip the next succeeding cartridge on said platform and to bring a subsequent cartridge to said reference position, and means operable with said subsequent cartridge at said reference position for initiating performance of said predetermined cycle of operation with said subsequent cartridge.

9. In tape recording-reproducing apparatus, the combination of means forming a tape cartridge receiving well, platform means slidably mounted in said well, means urging said platform means upwardly in said well, means operable to index tape cartridges on said platform means successively to a reference position, automatic means for performing a predetermined cycle of operation with a cartridge indexed to said reference position, said cycle including transport of said tape at a playing speed, and means actuatable only during part of said cycle for interrupting said cycle to transport said tape at a speed higher than said playing speed.

10. In tape recording-reproducing apparatus, the combination of means forming a tape cartridge receiving well, platform means slidably mounted in said well, means urging said platform means upwardly in said well, means operable to index tape cartridges on said platform means successively to a reference position, automatic means for performing a predetermined cycle of operation with a cartridge indexed to said reference position, said cycle including transport of said tape at a playing speed, means actuatable during part of said cycle for interrupting said cycle to transport said tape at a speed higher than said playing speed, and means rendered operative when operation of said actuatable means is discontinued for resuming said operating cycle at the stage where it was interrupted.

11. In tape recording-reproducing apparatus, the combination of means forming a tape cartridge receiving well, platform means slidably mounted in said well, means urging said platform means upwardly in said well, means operable to index tape cartridges on said platform means successively to a reference position, automatic means for performing a predetermined cycle of operation with a cartridge indexed to said reference position, said cycle including transport of said tape at a playing speed, means actuatable while the tape is being transported at said playing speed for interrupting said cycle to transport said tape selectively in the forward or in the reverse direction at a speed higher than said playing speed, and means rendered operative when operation of said actuatable means is discontinued for resuming transport of said tape in the forward direction at said playing speed.

12. In tape recording-reproducing means, the combination of a tape cartridge receiving well capable of containing a stack of tape cartridges, a platform movable between upper limits in said well and capable of supporting said stack of tape cartridges, electrical control means for controlling the movement of said platform to position the cartridges in said stack selectively to a reference position, and electrical switching means rendered operative when said platform is moved to its upper limit in the well for disabling said control means.

13. In a tape transducing apparatus for use with cartridges each having a supply of tape wound therein, a cartridge changer mechanism comprising a well adapted to receive a stack of cartridges, platform means mounted for vertical movement within said well, detent means for indexing successive cartridges for a stack of cartridges to a reference position in said well, automatic means for performing a predetermined cycle of operation with a cartridge indexed to said reference position, means for retracting said detent means upon completion of said predetermined cycle, and means for moving said platform vertically to afford movement of a cartridge to said reference position upon retraction of said detent means.

References Cited in the file of this patent

UNITED STATES PATENTS

| | | |
|---|---|---|
| 1,498,133 | Swem et al. | June 17, 1924 |
| 2,656,235 | Se Bastian | Oct. 20, 1953 |
| 2,664,251 | Berlant | Dec. 29, 1953 |
| 2,726,049 | Crain | Dec. 6, 1955 |
| 2,792,185 | Julliard | May 14, 1957 |
| 2,792,217 | Weidenhammer et al. | May 14, 1957 |
| 2,794,605 | Minter | June 4, 1957 |
| 2,813,686 | Schroter | Nov. 19, 1957 |
| 2,846,217 | Bormann et al. | Aug. 5, 1958 |
| 2,894,700 | Roberts et al. | July 14, 1959 |
| 2,926,861 | Murdoch | Mar. 1, 1960 |
| 2,941,738 | Burke et al. | June 21, 1960 |
| 3,025,011 | Camras | Mar. 13, 1962 |